United States Patent
Mileo et al.

(10) Patent No.: US 7,215,857 B2
(45) Date of Patent: May 8, 2007

(54) PROCESS AND APPARATUS FOR ELONGATING OF AN OPTICAL FIBRE PREFORM

(75) Inventors: Antonio Mileo, Ferrara (IT); Marco Ruzzier, Milan (IT)

(73) Assignee: Prysmian Cavi E Sistemi Energia S.r.L., Milan (IT)

( * ) Notice: Subject to any disclaimer, the term of this patent is extended or adjusted under 35 U.S.C. 154(b) by 0 days.

(21) Appl. No.: 10/522,530

(22) PCT Filed: Jul. 30, 2002

(86) PCT No.: PCT/EP02/08479

§ 371 (c)(1), (2), (4) Date: Oct. 12, 2005

(87) PCT Pub. No.: WO2004/018373

PCT Pub. Date: Mar. 4, 2004

(65) Prior Publication Data

US 2006/0086148 A1    Apr. 27, 2006

(51) Int. Cl.
G02B 6/02 (2006.01)
G01N 21/00 (2006.01)
C03B 37/07 (2006.01)
C03B 37/023 (2006.01)

(52) U.S. Cl. .................. 385/123; 65/377; 65/381; 65/382; 65/385

(58) Field of Classification Search .......... 65/381, 65/382, 385
See application file for complete search history.

(56) References Cited

U.S. PATENT DOCUMENTS

| | | |
|---|---|---|
| 5,755,849 A | 5/1998 | Hoshino et al. |
| 5,942,019 A | 8/1999 | Saito et al. |
| 6,178,778 B1* | 1/2001 | Kenmochi et al. ............ 65/381 |
| 2005/0138970 A1* | 6/2005 | Saitoh ......................... 65/393 |

FOREIGN PATENT DOCUMENTS

EP    0 846 665 A2    6/1998

OTHER PUBLICATIONS

"Drawing of Glass Material"; Nakahara et al.*
Yabuki et al., "Drawing Machine for Parent Material of Optical Fiber", Patent Abstracts of Japan of JP Publication No. 59-207849 (Nov. 26, 1984).

(Continued)

Primary Examiner—Michelle Connelly-Cushwa
Assistant Examiner—Chris Chu
(74) Attorney, Agent, or Firm—Finnegan, Henderson, Farabow, Garrett & Dunner, L.L.P.

(57) ABSTRACT

A process and apparatus for elongating an optical fibre preform includes heating the preform so as to soften one region thereof; elongating the preform by submitting the preform to a traction; determining, during the step of elongating, the preform diameter in at least one measuring point along the preform; and controlling the step of elongating on the basis of the determined diameter. During the step of elongating, at least a geometrical parameter of the preform is measured, and the position of said diameter measuring point is controlled according to the measured geometrical parameter. Measuring at least a geometrical parameter of the preform may be accomplished by determining the profile of at least a portion of the softened region, e.g., an image of the neck region profile.

21 Claims, 8 Drawing Sheets

OTHER PUBLICATIONS

Nakahara et al., "Drawing of Glass Material", Patent Abstracts of Japan of JP Publication No. 57-200238 (Dec. 8, 1982).

Tsuda et al., "Automatic Drawing Device for Parent Material for Optical Fiber", Patent Abstracts of Japan of JP Publication No. 61-295252 (Dec. 26, 1986).

Moriya et al., "Production of Optical Fiber Preform and Apparatus Therefor", Patent Abstracts of Japan of JP Publication No. 2000 264658 (Sep. 26, 2000).

Nakahara et al., "Elongation of Glass Rod", Patent Abstracts of Japan of JP Publication No. 57-092534 (Jun. 9, 1982).

Takagi et al., "Method for Stretching Glass Rod", Patent Abstracts of Japan of JP Publication No. 62-108743 (May 20, 1987).

Nakayama, "Stretching Method of Glass Body", Patent Abstracts of Japan of JP Publication No. 61-014149 (Jan. 22, 1986).

Hirasawa et al., "Method for Controlling Stretching of Glass Rod", Patent Abstracts of Japan of JP Publication No. 05-147971 (Jun. 15, 1993).

Koaizawa, "Method for Stretching Glass Rod", Patent Abstracts of Japan of JP Publication No. 08-091861 (Apr. 9, 1996).

* cited by examiner

PROCESS AND APPARATUS FOR ELONGATING OF AN OPTICAL FIBRE PREFORM

CROSS REFERENCE TO RELATED APPLICATION

This application is a national phase application based on PCT/EP2002/008479, filed Jul. 30, 2002, the content of which is incorporated herein by reference in its entirety.

BACKGROUND OF THE INVENTION

1. Field of the Invention

The present invention generally relates to the manufacturing of optical fibers, and particularly to processes for forming glass preforms for the optical fibers. Specifically, the invention concerns a process and an apparatus for the elongation of an optical fiber preform.

2. Description of the Related Art

Several processes are known for making glass preforms for drawing optical fibers. Such processes include the modified chemical vapour deposition (MCVD) process, the outside vapour deposition (OVD) process and the vapour axial deposition (VAD) process.

Many of the known processes for making the preforms include a stage, called elongation, in which a vitrified preform rod, formed according to different techniques depending on the specific manufacturing process, is submitted to reduction in diameter to obtain a preform of prescribed final diameter. To this purpose, the vitrified preform rod is heated, in a furnace or by means of a burner, up to the softening temperature. The preform rod is then stretched so as to reduce the diameter thereof in the softened region, referred to as "neck". The vitrified preform rod may have a central hole that, during the elongation stage, may collapse.

Several solutions are known for stretching the preform. According to some solutions, both ends of the preform are moved, while the heated region of the preform is kept steady. In this case, the preform is generally elongated along a vertical axis ("vertical elongation process"), and it is attached at the upper end thereof to a feeder; the feeder sustains the preform and feeds it to a furnace. At the bottom end, downstream the furnace, the preform is attached to a puller, providing the traction force necessary to stretch the preform.

Within the furnace, the preform is heated up to the softening temperature. The puller imparts a translation speed higher than the feed rate of the feeder, thereby the softened region of the preform is stretched. The outer diameter of the preform in the softened region is thus reduced and, if present, the preform central hole may collapse. Optionally, the feeder and the puller may also impart to the preform a rotation about its axis.

According to other solutions, one end of the preform is kept steady and the other end is moved, while the heated region is moved in a direction same as or opposite to the moving end of the preform. In this solutions, the preform is generally elongated along a horizontal axis ("horizontal elongation process"). The preform is heated by means of a horizontally movable heater, e.g. a burner mounted on a carriage. The preform ends are attached to mandrels of a horizontal lathe: one mandrel is kept steady, while the other is moved horizontally. The translation speeds of the movable mandrel and the heater determine the final diameter of the preform. Also in this case, the preform may be rotated about its axis.

Irrespective of the specific solution adopted for stretching the preform, the main objective of the preform elongation stage is that of obtaining rods of a prescribed diameter, to be submitted to subsequent processing up to the drawing of optical fibers. It is therefore of paramount importance to monitor the preform diameter during the elongation stage.

Various techniques have been proposed for monitoring the preform diameter during the elongation stage. Generally speaking, all these techniques call for measuring the preform diameter in a limited number of discrete points (one, two or three points) along the preform axis, particularly along the neck, for example by means of laser-based instruments; the measured diameter or diameters are typically compared to predetermined diameter values, and the feed rate of the feeder and/or the speed of the puller, or the speed of the movable mandrel and/or the speed of the heater, depending on the solution adopted for stretching the preform, are controlled accordingly. For example, assuming that the measured diameter is higher than the target diameter, the speed of the movable mandrel is increased, and vice versa.

Techniques providing for measuring the preform diameter in one prescribed point along the preform axis are for example described in JP 57092534, JP 62108743, JP 61014149, U.S. Pat. No. 5,755,849 and U.S. Pat. No. 5,942,019. JP 5147971, U.S. Pat. No. 6,178,778 and JP 8091861 are examples of prior art documents describing the measurement of the preform diameter in two or three discrete points along the preform axis.

In particular, U.S. Pat. No. 5,942,019, in relation to the elongation of preforms by means of a furnace, underlines the importance of setting the position for measuring the outer diameter of the taper portion (i.e., the neck). Summarising, in that document it is observed that in the case where the outer diameter measuring position is disposed near the upper end of the taper portion, i.e., near the heater, even when the moving speeds of the chucks are controlled to keep the outer diameter of the upper end of the taper portion constant, the outer diameter may be varied at the taper portion, thereby the outer diameter of the elongated body may become uneven and fluctuate. On the other hand, in the case where the outer diameter measuring position is disposed near the lower end of the taper portion, since the glass preform has almost been cooled at this position and its viscosity has been quite large to be elongated, even if a fluctuation in the outer diameter is detected, it can hardly be corrected. Still according to U.S. Pat. No. 5,942,019, the optimal outer diameter measuring position, which varies depending on the outer diameter of the glass preform before elongating, the outer diameter of the elongated body, the heater temperature, the inner diameter of the furnace core tube and the like, is to be determined experimentally.

According to the Applicant, determining the optimal position of the diameter measurement point by means of experiments is not satisfactory from an industrial application viewpoint.

The Applicant has moreover noticed that prior art methods provides for measuring the diameter in one, two or three prefixed points, in particular in points that have no correlation with the actual geometry of the neck of the preform being elongated, and that because of the dependency of the neck length and shape on several process parameters, such as the initial and final diameter of the preform, the process operating speeds, the temperature profiles, the speed of rotation of the preform, if provided, the diameter of the preform central hole, if present, and the internal pressure, the neck geometry may vary from process to process and even in the course of a single elongation process. The Applicant has found that, for this reason, measuring the neck diameter in prefixed points, which are not correlated to the geometry of the neck, does not allow a precise control of the preform final diameter.

SUMMARY OF THE INVENTION

Based on these considerations, the Applicant has devised a new optical fiber preform elongation process, which comprises, during the step of elongating the preform, measuring at least a geometrical parameter of the preform being elongated and controlling the position of a preform diameter measuring point according to the measured geometrical parameter.

In particular, measuring the at least a geometrical parameter may comprise detecting a profile of at least a portion of the preform softened region, for example capturing a digital image of the at least a portion of the softened region.

According to a first aspect of the present invention, there is provided an optical fiber preform elongation process.

Briefly stated, the process comprises heating the preform so as to soften one region thereof; elongating the preform by submitting the preform to a traction; determining, during the step of elongating, the preform diameter in at least one measuring point along the preform; and controlling the step of elongating on the basis of the determined diameter.

The process further comprises measuring, during the step of elongating, at least a geometrical parameter of the preform; and controlling, during the step of elongating, the position of said diameter measuring point according to the measured geometrical parameter.

In an embodiment of the invention, measuring at least a geometrical parameter of the preform comprises determining the profile of at least a portion of the softened region.

In particular, measuring at least a geometrical parameter of the preform may comprise detecting, from said determined profile, at least one among a softened region starting point and a softened region final point, and controlling the position of said measuring point comprises choosing a diameter measuring point located at a predetermined distance from one among the softened region starting point and the softened region final point.

Measuring at least a geometrical parameter of the preform may further comprise detecting, from said determined profile, the length of the softened region, and said predetermined distance may be a predetermined percentage of said length.

In an embodiment of the invention, the profile is determined by detecting a predetermined number of points along the profile of the preform and interpolating said points.

Preferably, determining the profile comprises capturing a digital image of the at least a portion of the softened region.

In an embodiment of the invention, controlling the step of elongating comprises comparing the determined diameter with a target diameter.

The process may comprise feeding the preform to a furnace at a first speed, and submitting the preform to a traction by pulling the preform out of the furnace at a second speed; controlling the step of elongating comprises controlling at least one among the first speed and the second speed.

Alternatively, the process may comprise exposing the preform to a heater movable along a preform axis at a first speed, and applying a traction by pulling at least one end of the preform at a second speed; controlling the step of elongating comprises controlling at least one among the first speed and the second speed.

According to a second aspect of the present invention, there is provided an optical fiber preform elongation process.

Summarising, the process according to this second aspect of the invention comprises heating the preform so as to soften one region thereof; elongating the preform by submitting the preform to a traction; determining at least a geometrical parameter of the preform; and controlling the step of elongating on the basis of the detected geometrical parameter.

Determining at least a geometrical parameter comprises detecting the profile of at least a portion of the softened region.

In particular, detecting the profile comprises detecting a predetermined number of points along the profile of the preform and interpolating said points.

Preferably, detecting the profile comprises capturing a digital image of the at least a portion of the softened region.

In an embodiment of the invention, determining at least a geometrical parameter comprises determining the preform diameter in a measuring point of the softened region, and controlling the step of elongating comprises comparing the determined diameter with a target diameter.

In particular, determining the preform diameter comprises controlling the position of the measuring point according to said detected profile.

The process may further comprise controlling the target diameter according to said detected profile.

In an embodiment of the invention, the preform diameter is determined from said detected profile.

In particular, determining at least a geometrical parameter comprises determining, from said detected profile, at least one among a softened region starting point and a softened region final point, and controlling the position of the measuring point comprises choosing a measuring point located at a predetermined distance from one among the softened region starting point and the softened region final point.

In an embodiment of the invention, measuring at least a geometrical parameter of the preform further comprises detecting, from said determined profile, the length of the softened region, and said predetermined distance is a predetermined percentage of said length.

According to a third aspect of the present invention, there is provided a process for manufacturing an optical fiber.

In brief, the process according to this third aspect of the invention comprises producing a glass preform and drawing the glass preform into an optical fiber.

Producing the glass preform comprises the steps of heating an intermediate preform so as to soften one region thereof; elongating the intermediate preform by submitting the intermediate preform to a traction; detecting, during the step of elongating, the preform diameter in at least one measuring point along the intermediate preform; and controlling the step of elongating on the basis of the detected diameter.

The process further comprises measuring, during the step of elongating, at least a geometrical parameter of the preform; and varying, during the step of elongating, said measuring point according to the measured geometrical parameter.

According to a fourth aspect of the present invention, an apparatus for elongating an optical fiber preform is provided.

Briefly stated, the apparatus comprises a monitoring device for obtaining information on geometrical parameters of the preform being elongated; and a control device for controlling elongation process parameters using the preform geometrical parameters information.

The monitoring device comprises an image capturing device for obtaining a profile of at least a portion of a softened region of the preform; and a processing device for analysing the profile for extracting information on the preform geometrical parameters.

BRIEF DESCRIPTION OF THE DRAWINGS

These and other features and advantages of the present invention will be made apparent by the following detailed description of an embodiment thereof, provided merely by way of non-limitative example, which will be made in connection with the attached drawings, wherein.

DETAILED DESCRIPTION OF THE INVENTION

Figure 1:
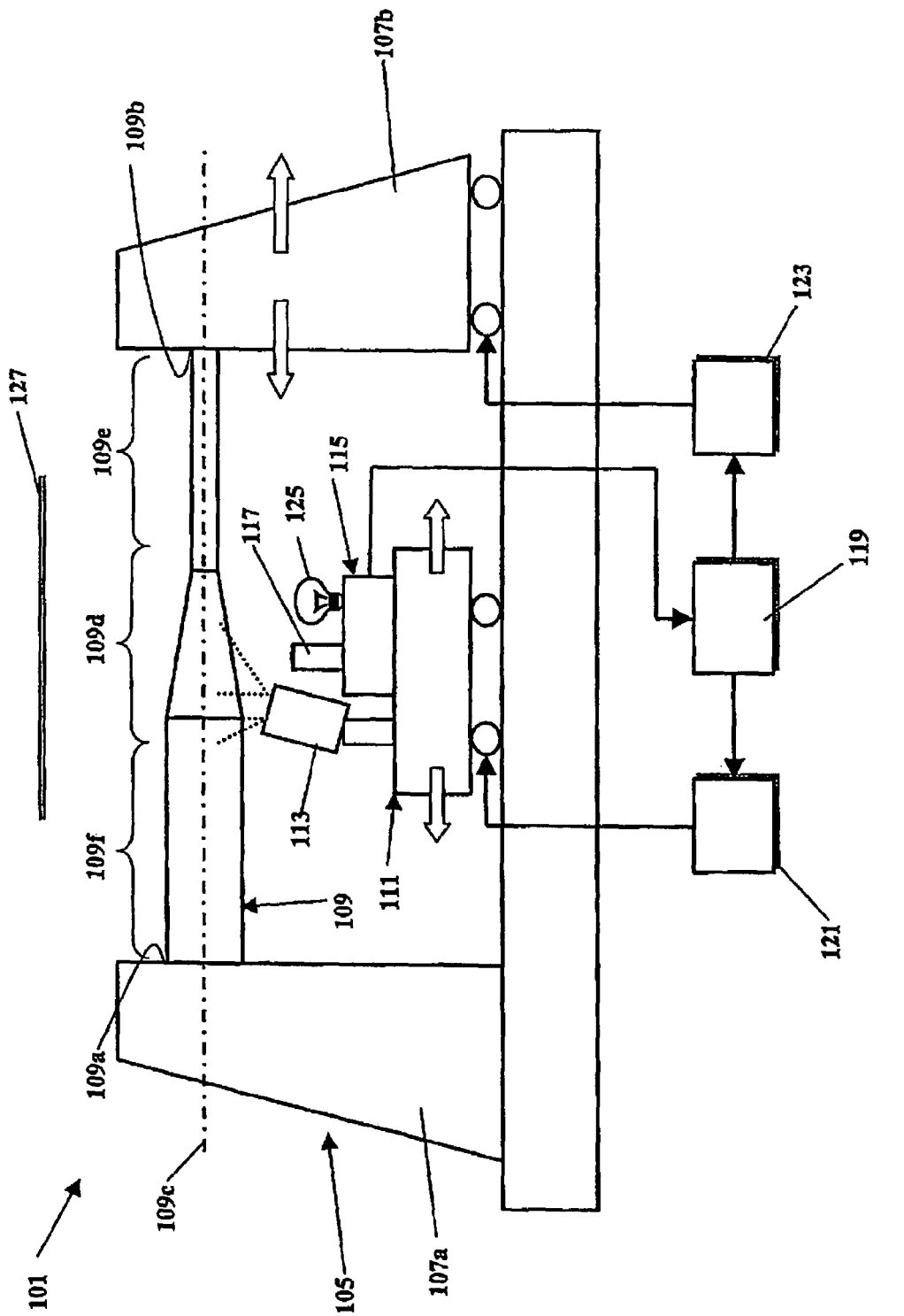
FIG. 1 is a pictorial view of a preform elongation apparatus according to an embodiment of the present invention.

With reference to the drawings, FIG. 1 is a pictorial, very schematic representation of an apparatus for elongating an optical fiber preform, according to an embodiment of the present invention.

The elongation apparatus, identified globally by 101, comprises a horizontal lathe 105, having a steady mandrel 107a and a movable mandrel 107b, spaced apart horizontally.

A glass preform 109 is attached at a first and second ends 109a, 109b thereof to the steady and movable mandrel 107a, 107b, respectively. To this purpose, the first and second preform ends 109a and 109b may be provided with conventional handles (not shown in the drawing). The preform 109 extends therefore between the steady and the movable mandrels 107a and 107b in such a way that a longitudinal axis 109c of the preform lies in a substantially horizontal plane.

A movable carriage 111 is provided, movable on a horizontal plane along the direction of the preform axis 109c. The carriage 111 carries a burner 113, oriented towards the preform for heating a region thereof up to a softening temperature, and a visual image capturing system 115, comprising for example a high-definition digital camera 117, adapted to capture an image of at least a portion of a softened region 109d (the neck) of the preform 109, intermediate between an already elongated preform section 109e, the diameter of which has already been reduced to the desired final diameter, and a non-elongated preform section 109f, the diameter of which is equal to the preform initial diameter. In particular, the image capturing system is adapted to capture an image of at least a final portion of the neck 109d, proximate to the already elongated preform section 109e. The image capturing system 115 may include a light source 125, adapted to illuminate the preform region 109d of which the image is to be captured. Where possible, a suitable background element 127 is provided along the preform at the opposite side of the image capturing system 115, to ensure sufficient contrast of the neck image with respect to the image background. Alternatively, the light source is located opposite to the image capturing system 115.

Preferably, the digital camera 117 is provided with a filter or filters for improving the quality of the captured images; in particular, infrared filters or polarizing filters may be used. In case a monochromatic light source is used, the filters are selective towards the light source wavelength.

The image capturing system 115 feeds a processing and control unit 119, for example a personal computer with installed a suitable image processing software. The processing and control unit 119 processes visual images captured by the image capturing system 115, analyses the processed image and controls one or both of two drive units 121, 123 (e.g., motors) driving the carriage 113 and the movable mandrel 107b, so as to set the respective translation speeds, for controlling the diameter of the elongated preform.

It is pointed out that the type of apparatus employed for elongating the preform is not to be intended as limitative for the present invention. Instead of the exemplary apparatus described before, a vertical elongation apparatus comprising a preform feeder, a furnace and a preform puller could for example be employed. In this case, a camera can be associated with the furnace in such a way as to be able to capture an image of the neck or of a predetermined portion thereof.

Figure 2:
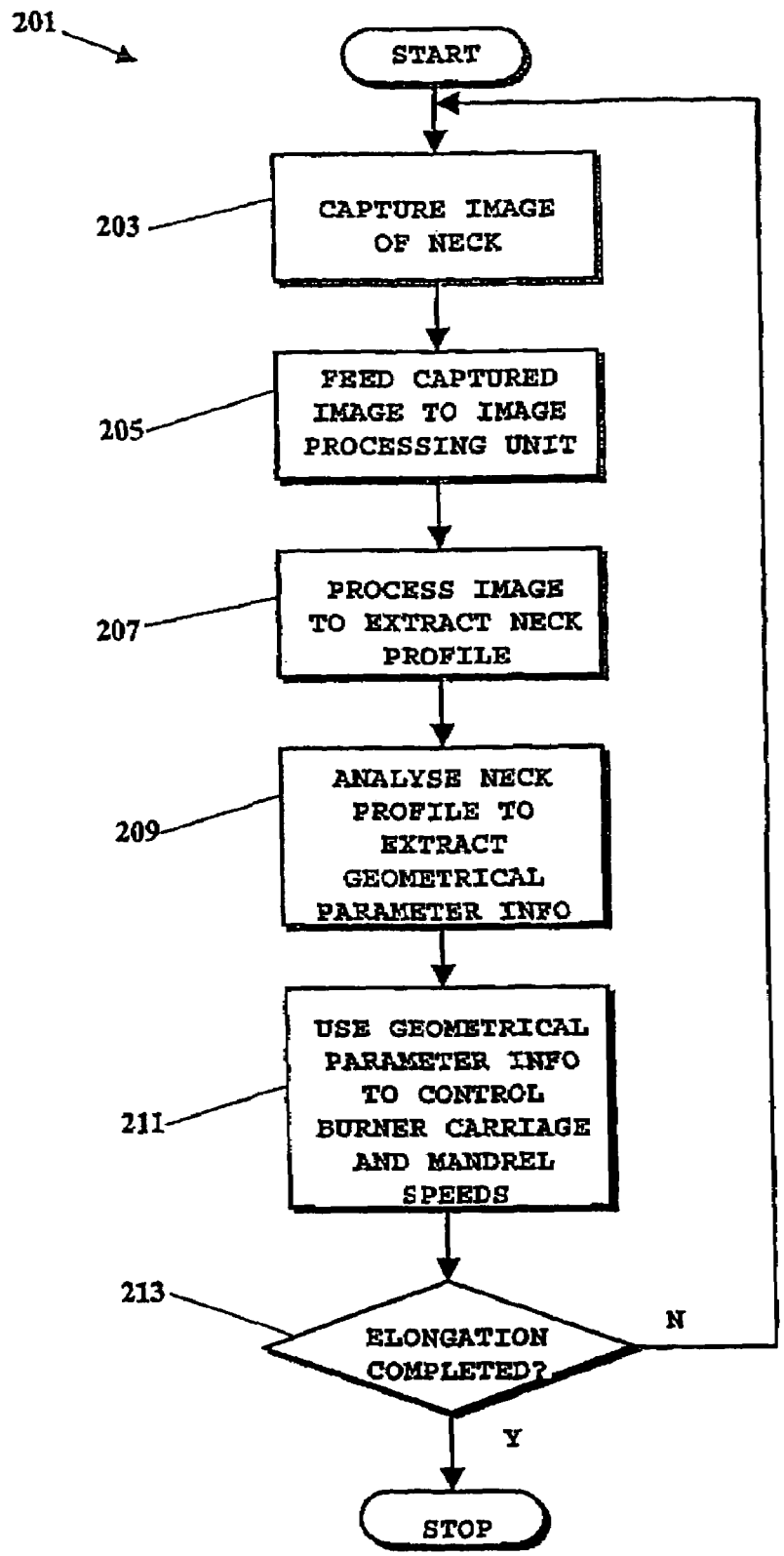
FIG. 2 is a simplified flowchart of a preform elongation control method according to an embodiment of the present invention.

FIG. 2 shows a simplified flowchart illustrating the main steps of a preform elongation control procedure 201.

In a first step (block 203) an image of the neck 109d (or at least of a portion thereof, preferably the portion proximate to the preform section 109e) is captured by the image capturing system 115.

The captured image is fed to the processing and control unit 119 (block 205). By means of the image processing software, the processing and control unit 119 processes the captured image; in particular, the image processing allows separating the significant parts of the image (the preform neck) from the non-significant image parts, such as the background, or disturbs, and extracting a continuous profile of the preform neck, or of the at least a portion thereof (block 207).

An analysis of the neck profile that is obtained from the image processing procedure is then performed by the image processing and control unit 119 to extract geometrical parameters of the neck from the obtained profile (block 209), and the results of the neck profile analysis are exploited to control the speed of the carriage 111 (and thus of the burner 113) and/or of the movable mandrel 107b (block 211), thus implementing a control loop. For example, by means of the analysis of the neck profile, significant parameters can be extracted that are used for controlling the elongation stage.

The procedure goes on until the whole preform has been elongated (block 213).

Concerning the image processing (block 207), it is observed that the image captured by a digital camera is represented by a matrix of picture elements (pixels); a pixel is the elemental unit in which the captured image is subdivided. The number of pixels in the matrix depends on the precision (resolution) of the digital camera: for example, a digital camera having a resolution of 1,000×1,000 pixels provides images represented by a matrix of 1,000,000 pixels (1,000 along the horizontal direction and 1,000 along the vertical one), each pixel corresponding to a respective area of the scene.

Each pixel has associated therewith an information relating to the colour of the corresponding area of the scene; in a black-and-white digital camera, the colour is represented by a grey level in a grey level scale whose two extremes corresponds to the black and the white, respectively. The colour or grey level information associated with each pixel is encoded in a digital code. For example, a digital camera in which each grey level is expressed by means of a 12-bit digital code allows discriminating among 4096 different grey levels, and to each pixel there is associated a 12-bit binary coded integer of value comprised between $2^0$ (e.g., corresponding to the black) and $2^{12}$ (corresponding to the white), identifying the level of grey of that pixel.

Processing the image corresponds to processing the matrix of pixels and the associated binary codes representing the respective grey levels.

Any commercially available image processing software can in principle be exploited; alternatively, a custom designed image processing software may be used. Independently of the image processing software adopted, the basic actions preformed in the image processing step are described herein below.

Before trying to extract the neck profile from the captured image, the image is preferably filtered to suppress noise and disturbs. Any known image filtering algorithm can be adopted.

After having filtered the captured image, the contour of the preform neck is identified. This step provides for identifying, among all the pixels in the pixel matrix, the pixels that belong to the neck contour. One possible algorithm for achieving this result provides for establishing a prescribed threshold grey level. Then, the pixels in the matrix having a grey level lower (alternatively, higher) than the prescribed threshold are identified and declared to belong to the neck contour. An alternative algorithm may identify the pixels belonging to the neck contour by comparing the grey level of pixels adjacent to each other, and declaring that all the pixels whose grey levels differ from the grey levels of the previous pixels of at least a prescribed value belong to the neck profile. Other pattern recognition algorithms may be used, implemented by commercially available computer programs.

Optionally, once the pixels belonging to the neck contour have been identified, an image interpolation can be carried out to increase the precision of the image. To this purpose, known image interpolation algorithms can be exploited. The precision of the image can thus be increased beyond that of the single pixel.

Figure 3:
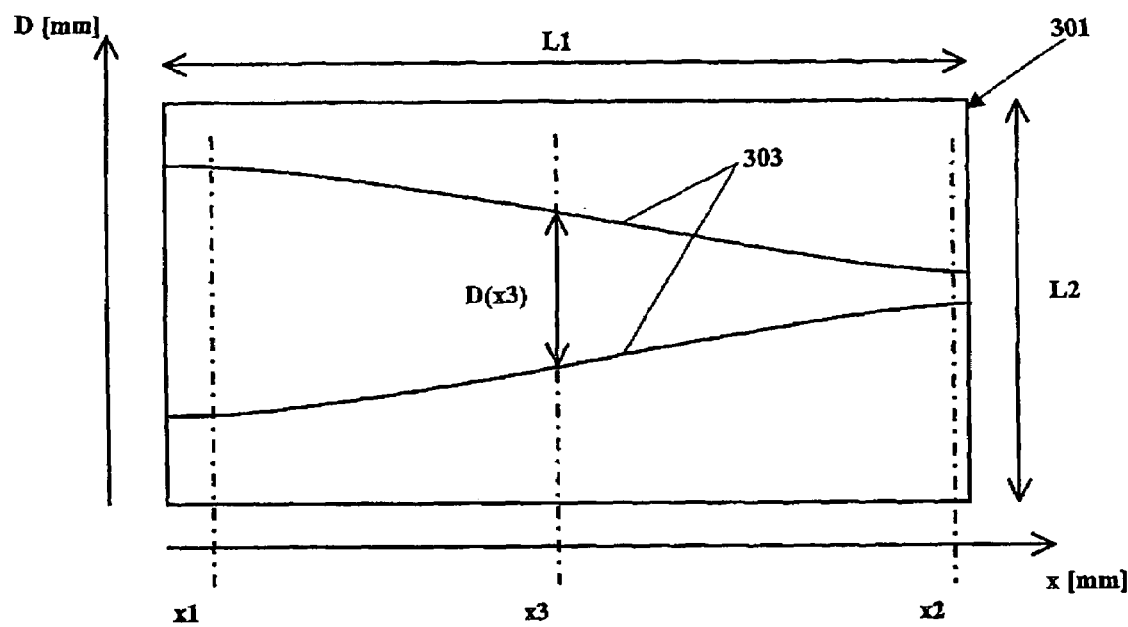
FIG. 3 schematically shows a profile of the preform softened region (the preform "neck"), resulting from an image processing procedure of the preform elongation control procedure.

FIG. 3 schematically shows a continuous neck profile that is obtained from the captured image after the captured image has been processed; actually, the neck profile obtained from the captured image is normally not continuous (being obtained from pixels), but the precision of the image capturing system and the image processing software can be such that the profile can, at all effects, be regarded as substantially continuous. The rectangle 301 represents the image area, and the curves 303 within the rectangle 301 identifies the neck profile. The conversion factor from pixels to metric units can be determined rather easily provided that the area of the scene (L1 and L2) in metric units is known. Alternatively, or in addition, a metric reference can be introduced in the area of scene. In still another embodiment, a conventional diameter measurement device can be provided upstream and/or downstream the image capturing system; the diameter value measured by such device or devices can be used as a set point for the pixel-to-metric unit conversion (the neck diameter, in metric units, measured by such diameter measurement device is compared to the neck diameter in pixel obtained from the captured image, and the pixel-to-metric unit conversion factor is established).

It can be appreciated that the information that can be derived from the obtained continuous profile of the neck, or even of a portion thereof, for example the portion of the neck proximate to the already elongated preform section, is substantially richer than that derivable from a simple measurement of the preform diameter in one or more discrete points along the neck.

In particular, obtaining the continuous profile of the neck allows overcoming the problems, affecting the conventional elongation control techniques, inherent to the choice of the point or points in which to measure the preform diameter.

For example, the analysis of the obtained neck profile allows determining in real time the neck starting point (x1 in FIG. 3) and the neck final point (x2 in FIG 3), the neck length (|x2−x1|), the diameter of the preform (D in FIG. 3) at every point along the neck. The analysis of the neck profile may even allow deriving a mathematical formula describing analytically the neck profile.

From a practical viewpoint, the choice of the image capturing system shall take into account two important parameters, that are the resolution of the captured images and the scan frequency.

As mentioned, the image resolution is an indication of the precision of the image capturing system.

The level of detail in the captured image depends however not only on the resolution of the image capturing system, but also on the area of the scene. By way of example, if the above mentioned 1,000×1,000 pixels digital camera is used to get an image of a scene having an area of 100×100 mm, each pixel represents an area of 0.1×0.1 mm of the scene.

Image interpolation processes may allow increasing the precision of the captured image, enabling to detect details below the dimension of the pixel.

The scan frequency is an indication of the number of times per second the image is captured. In order to constantly monitor the neck shape during the preform elongation stage, a sufficiently high scan frequency is required. However, there is a trade off between the scan frequency and the precision of the captured image: the higher the image precision, the higher the resolution of the image capturing device, the higher the number of pixels, the more bits need to be transferred, the lower the scanning frequency.

Commercially available digital cameras feature resolutions in pixels of the order of 512×512, 1000×1000, 1300×1000, 2000×2000 and 4000×4000, with decreasing scan frequencies (from 100–200 frame per seconds—fps—to 0.5 fps). Assuming again that an image of a scene of area 100×100 mm is to be captured, the precision of the image increases with the increase in resolution, but at the expense of a decrease in the scan frequencies.

A satisfactory trade off is considered reached adopting a commercially available digital camera having a resolution of 1300×1000 pixels with a scan frequency of about 15 fps; this digital camera allows obtaining images of a scene of area 100×100 mm with a precision at least equal to 0.076 mm, and is considered suitable for acquiring images of the preform neck profile that can be used for finely controlling the elongation process.

If a higher precision is desired, without impacting the scan frequency, custom designed image capturing systems can be exploited.

It is pointed out that although a black-and-white digital camera is advantageous in terms of image definition and scan frequency, an analogue camera, and particularly a colour camera may be used. Other types of visual image capturing systems may be envisaged, for example laser-based instruments moved longitudinally to the neck at a suitable speed.

It is observed that, by using suitable interpolation algorithms, a continuous profile may also be reconstructed starting from a limited number of points, much lower that the number of points provided by a camera.

The high information content inherent to the availability of the continuous neck profile allows implementing a variety of techniques enabling an effective control of the preform elongation stage.

Figure 4:
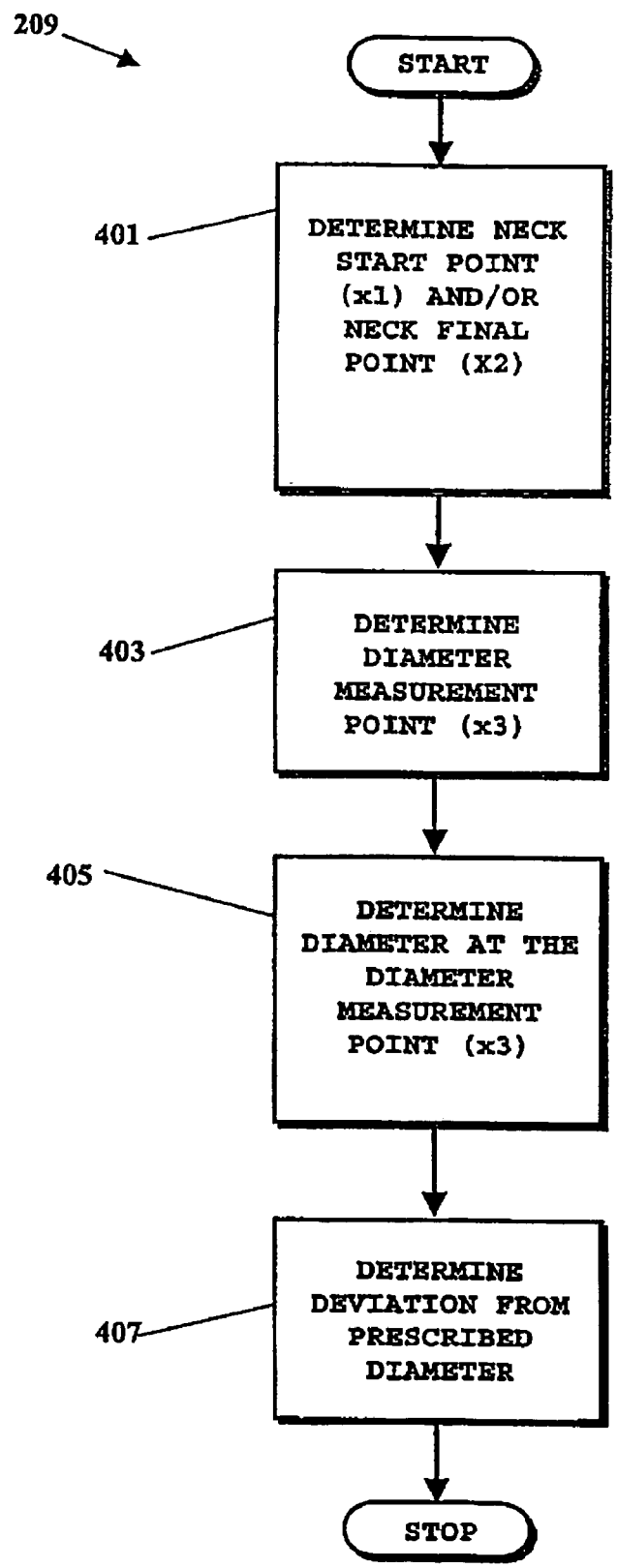
FIG. 4 is a simplified flowchart of a preform neck profile analysis procedure of the preform elongation control procedure.

An exemplary embodiment of control technique according to the present invention will be now described, referring to the simplified flowchart of FIG. 4 that schematically shows the neck profile analysis procedure of block 209 in FIG. 2.

Firstly, the neck profile is analysed to determine the neck starting point x1 and/or the neck final point x2 (block 401). The neck starting point x1 can be determined for example by determining the point along the neck profile at which the diameter of the preform for the first time falls below the preform initial diameter of a prescribed threshold. In case an analytical formula describing the neck profile is extrapolated from the neck profile, the neck starting point x1 can be determined by monitoring the first derivative. The neck final point x2 can be determined in a similar way.

Based on the determined neck starting and final points x1 and x2, the point x3 along the neck is determined at which the neck diameter D(x3) is to be calculated (block 403).

Figure 5A:
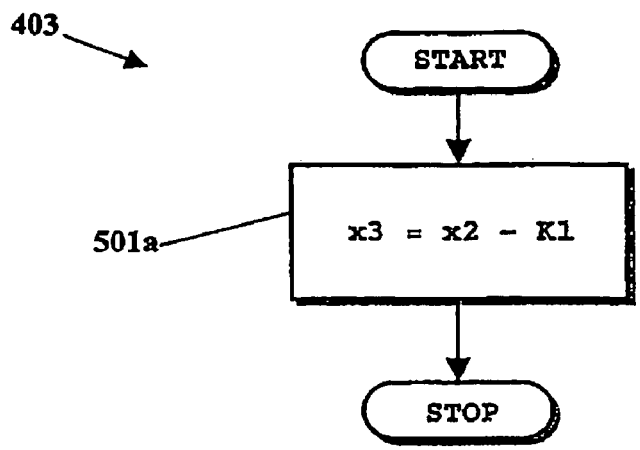
FIGS. 5A, 5B and 5C are simplified flowcharts of three alternative embodiments of a procedure for determining a diameter measurement point along the preform neck.
Figure 5B:
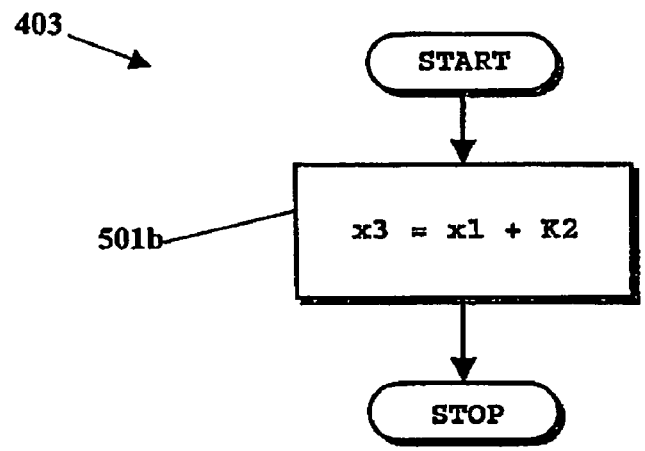
Figure 5C:
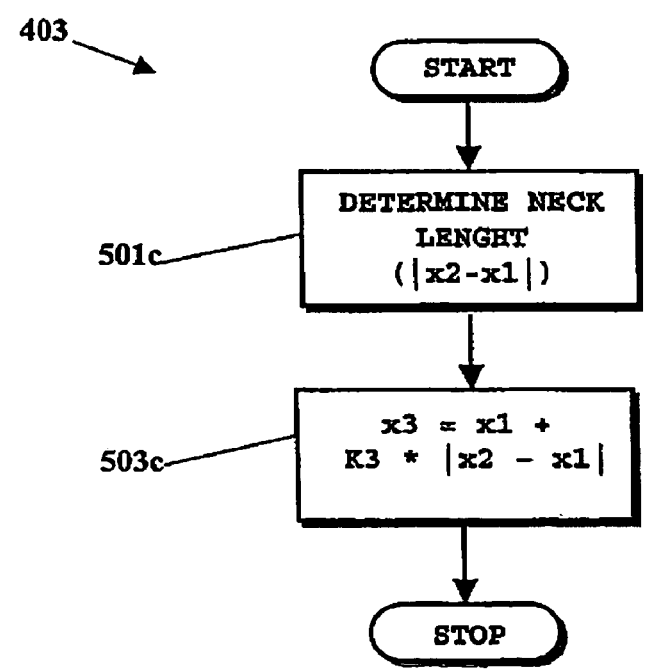

FIGS. 5A, 5B and 5C are simplified flowcharts of three possible procedures for determining the optimal point x3 at which the neck diameter is to be calculated so as to enable a precise control of the preform diameter.

According to a first procedure, shown in FIG. 5A, the point x3 at which the neck diameter is to be calculated is fixed with respect to the neck final point x2; once the neck final point x2 is determined, the point x3 is obtained subtracting from the point x2 a prescribed constant K1 (block 501a).

According to a second procedure, shown in FIG. 5B, the point x3 is fixed with respect to the neck starting point x1; once the neck starting point x1 is determined, the point x3 is obtained adding to the point x2 a prescribed constant K2 (block 501b).

According to a third procedure, shown in FIG. 5C, the length of the neck is first calculated (block 501c) by subtracting x1 to x2, and the point x3 is determined by calculating a distance from the neck starting point x1 equal to a prescribed percentage K3 of the neck length |x2-x1| (block 503c). Alternatively, the point x3 can be determined as a distance from the neck final point x2 equal to a prescribed percentage of the neck length.

It can be appreciated that since points x1 and x2 are subjected to variations during the process of elongation, the point x3 varies as well.

It is pointed out that the choice of the reference for determining the point at which the preform diameter is to be calculated depends on the type of control algorithm. For example, if it is preferred to monitor the preform diameter in a region proximate to the final section of the neck, it is preferable to calculate the preform diameter at a point located at a prescribed distance from the neck final point (determined by inspection of the neck profile). It is also possible to monitor the preform diameter in two or more positions, one proximate to the neck final point and one proximate to the neck starting point; in this case, the diameter of the preform may be calculated at a point located at a prescribed distance from the neck final point, and at a point located at a prescribed distance from the neck starting point, both the neck final point and the neck starting point being derived by inspection of the neck profile.

After having determined the point x3 at which the neck diameter is to be calculated, the diameter D(x3) at such point along the neck is calculated from the neck profile (block 405).

After having calculated the neck diameter D(x3) in the prescribed point x3, the calculated diameter D(x3) is compared to a prescribed, target diameter, stored in the processing and control unit 119, and the deviation of the calculated diameter from the target diameter is determined (block 407). Such a deviation is used to control the speeds of the movable mandrel 107b and of the carriage 111 carrying the burner 113 (block 211 in FIG. 2). For example, if the calculated diameter is higher than the target diameter, the speed of the movable mandrel is increased, and vice versa.

Summarising, on the basis of the continuous profile of the neck obtained after processing the image captured by the image capturing device 115, the diameter of the preform is determined (from the analysis of the neck profile) in at least one point (identified as x3 in FIG 3) whose position along the neck is not fixed with respect to the heated region of the preform, in particular to the heating element (furnace or burner), as in the known techniques, but varies depending on the neck geometry, which is derived from the analysis of the neck profile. For example, the diameter of the neck is calculated at a point, along the neck profile, which is fixed with respect to the neck starting point or to the neck final point, determined in turn by analysing the neck profile.

Compared to the known techniques, in which the position of the point or points at which the preform diameter is measured is fixed with respect to the heated region of the preform, monitoring the neck profile at a point or points whose position is not fixed a priori, but depends on the actual neck geometry allows reducing the problems inherent to the variation of the neck shape and length due to varying process parameters.

In an alternative embodiment, the diameter of the preform is calculated from the obtained profile in one or more prefixed points, whose position does not vary with the geometry of the neck. The information on the neck geometry derived from the analysis of the acquired image of the neck is exploited to vary the target value or values according to the geometry of the neck.

Experimental Results

The Applicant has conducted some experiments, which are reported hereinbelow.

Neck Profile Acquisition

Figure 6:
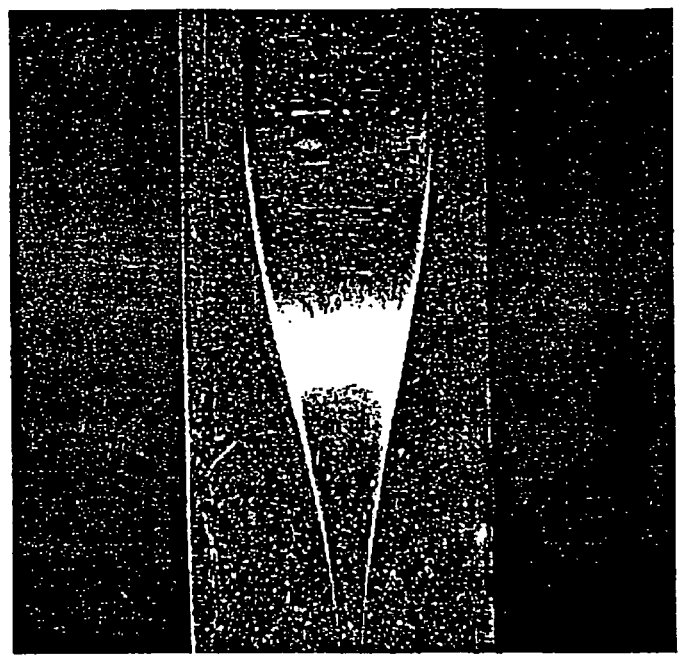
FIG. 6 is an image of a preform neck captured during a neck profile acquisition experimental trial conducted by the Applicant using a black-and-white digital camera.

FIG. 6 shows the image of a preform neck captured using a black-and-white digital camera with 256 grey levels (having values ranging from 0 to 255), a resolution of 1360×1024 pixels and a scan frequency of 9.5 fps, placed at approximately 60 cm from the preform. This image was fed to the processing and control unit 119, which performed an image processing. The neck has been obtained by means of a vertical elongation process; in particular, the image has been taken stopping the elongation process and sliding the preform down the furnace. The rectangle visible around the preform is a containing tube normally associated with the lower portion of the furnace.

Figure 7:
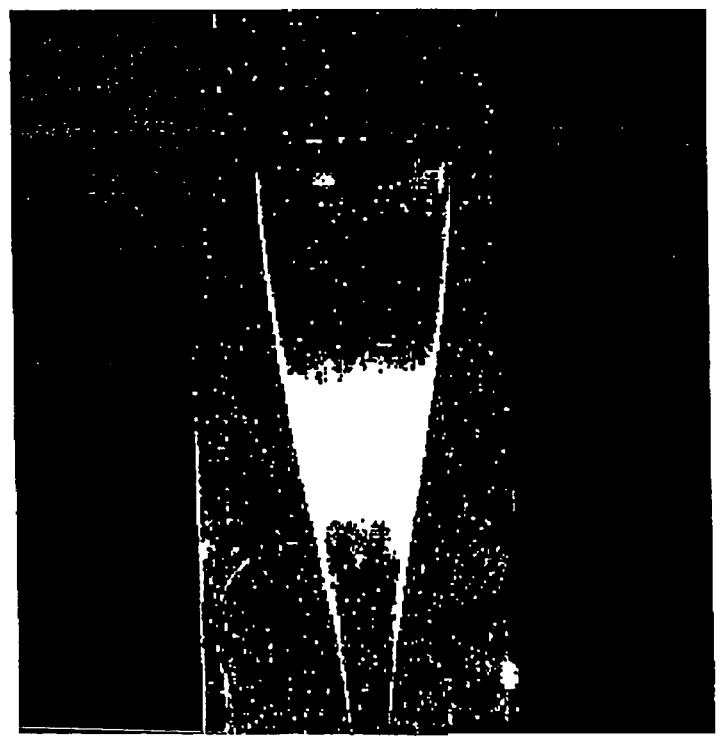
FIG. 7 shows the image of the neck after a first image processing step involving converting the grey level of any pixel into black or white according to a predetermined threshold.

FIG. 7 shows the captured image after a first image processing stage. In particular, in order to identify the area of the image occupied by the neck, the pixels having a grey level lower than a prescribed threshold value, in particular 210, have been converted to black pixels (grey level value equal to 0), while the pixels having a grey level higher than the prescribed threshold value have been converted to white pixels (grey level value equal to 256). It can be appreciated that in the image resulting from this first processing stage the shape of the neck can be identified rather clearly, albeit several disturb are present, having however an area much smaller than that of interest. The disturbs were eliminated from the image by means of a filtering process, suppressing all the white areas below a prescribed dimension threshold. The image resulting from such filtering process is shown in FIG. 8.

Figure 8:
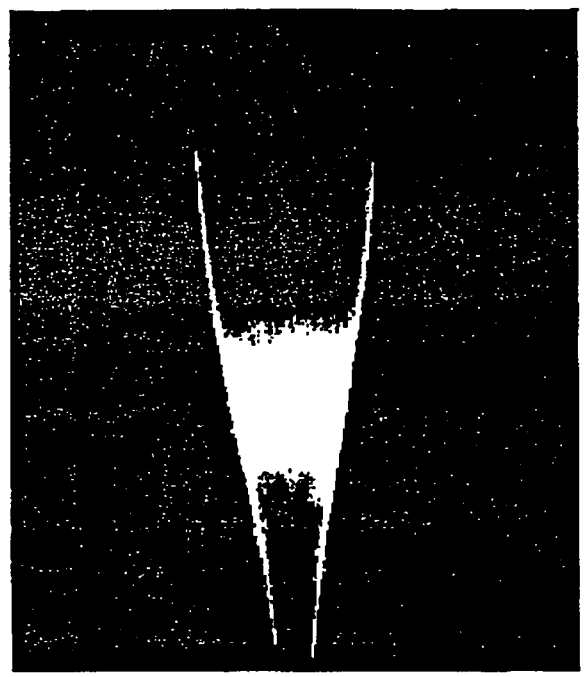
FIG. 8 shows the image of the neck after a second image processing step involving filtering the image for eliminating disturbs.
Figure 9:
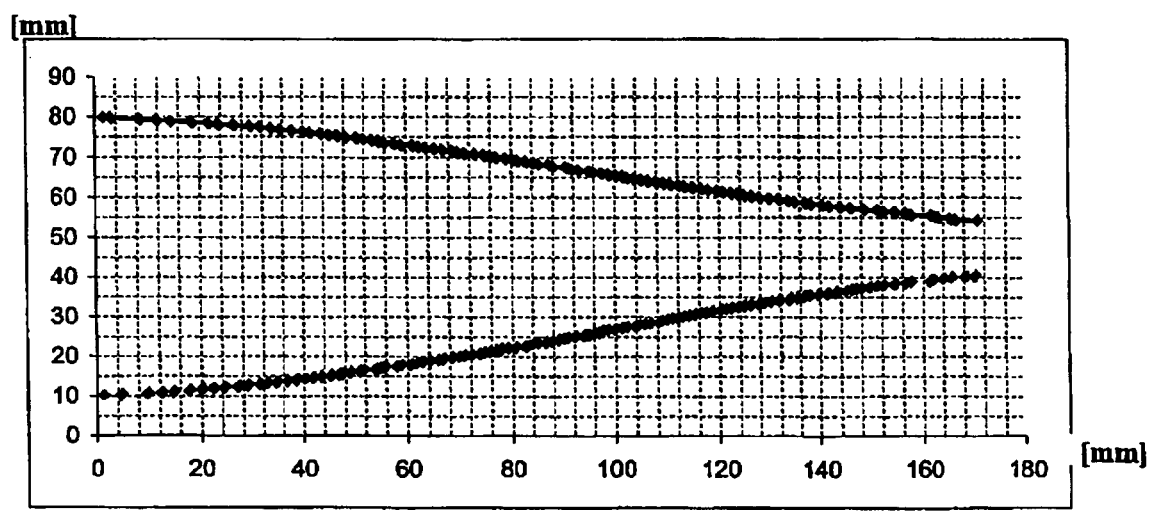
FIG. 9 shows the neck profile extracted from the processed image of FIG. 8.

Then, sections of the image of FIG. 8 were taken along each row of the pixel matrix (i.e., transversally to the preform axis), and the pixels lying on the contour of the neck were identified as those at which transition from black to white and from white to black occurs. In this way, the neck profile depicted in FIG. 9 was determined; in this diagram, the scales of the axes are in millimeters, and the neck profile is turned of 90° compared to the image of FIG. 8.

Figure 10:
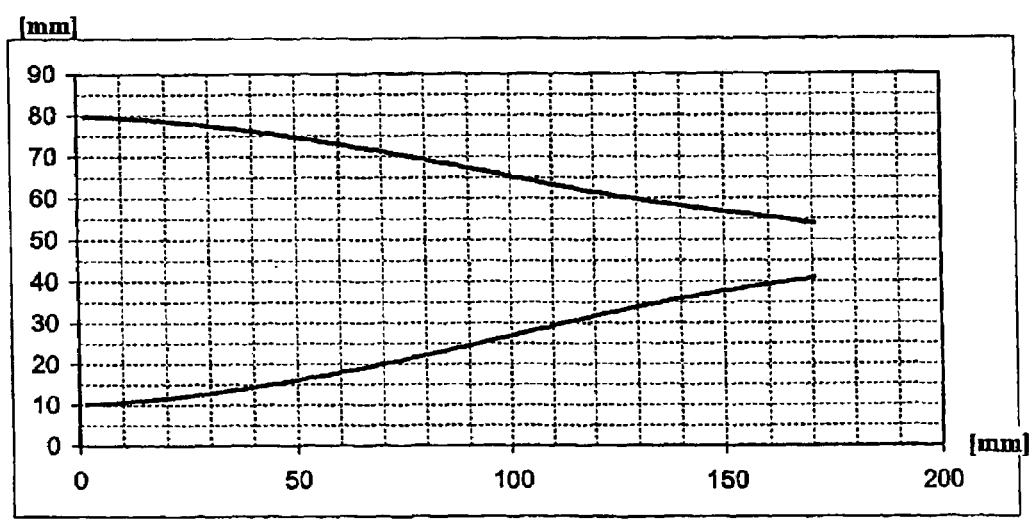
FIG. 10 shows the neck profile obtained interpolating the neck profile of FIG. 9.

FIG. 10 depicts the neck profile after an interpolation process; in particular, the interpolation was carried out using polynomial functions of the sixth order, that interpolated the data with a root mean square error equal to 0.9998.

Using a commercial microprocessor with a clock frequency of about 700 MHz, the steps from the image capture to the interpolation last approximately 50 ms, corresponding to a maximum scan frequency of approximately 20 fps. The cost in term of computing time clearly depends on the image resolution and on the type of image processing algorithm. In case higher image resolutions or more complex image processing algorithms are desired, more powerful microprocessors can be used.

Elongation Stage Control

The Applicant also conducted experimental trials to verify that, based on the analysis of the acquired neck profile, a more precise control of the preform elongation stage can be achieved.

In particular, the Applicant executed two processes of elongation of two preforms, using an apparatus as that pictorially shown in FIG. 1. During the elongation stage, the movable mandrel 107b was moved rightwards, while the carriage 111 carrying the burner 113 was moved leftwards. It can be shown that, for reasons of mass flow balance, the starting and final diameters D1 and D2 of the preform prior to and after the elongation, and the translation speeds V1 and V2 of the mandrel and the burner are related by the following equation:

$$D1^2 * V1 = D2^2 * (V1 + V2)$$

The two elongation processes were carried out keeping fixed the initial and final diameters D1 and D2 at respective values of 20 mm and 15.3 mm, but varying the speeds V1 and V2. In particular, the first process was carried out with V1=21 mm/min and V2=15 mm/min, while for the second process the speeds were V1=32 mm/min and V2=23 mm/min. It is pointed out that such a large difference in the speed between different processes was deliberately introduced to magnify the effects of the change in process parameters on the preform elongation.

A digital camera similar to that used in the image acquisition experiment previously reported has been employed. The profiles of the preform necks for the two processes were determined.

Figure 11:
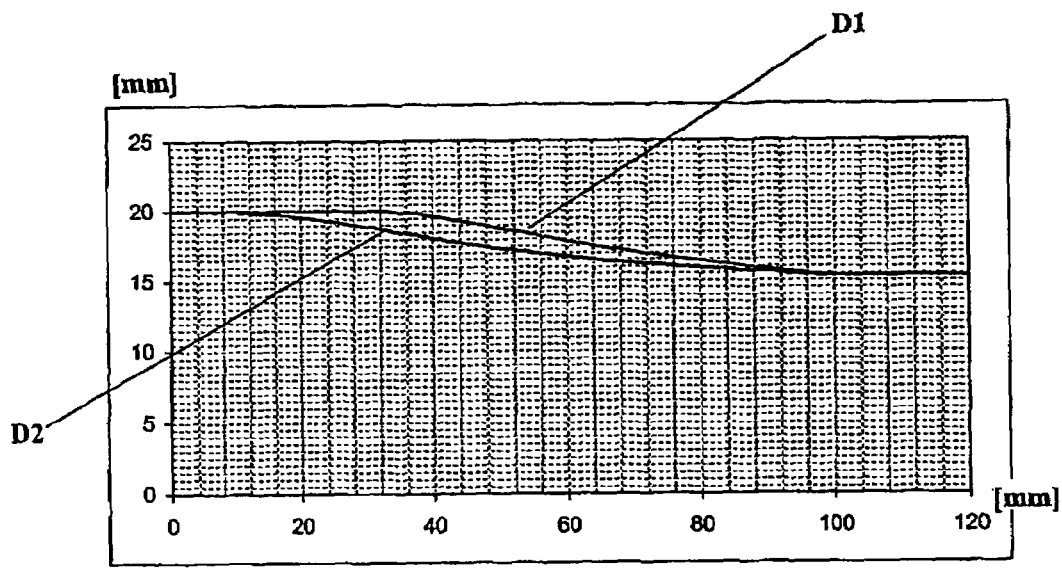
FIG. 11 shows the profiles of the neck of two preforms elongated according to elongation processes with different operating parameters.

FIG. 11 reports the diameter of the preforms along the axes thereof in the neck region, in the two elongation processes; these diameter values were obtained analysing the profile of the neck in the two cases. It can be appreciated that despite the initial and final diameters are the same, the diameter varies according to different laws in the two processes, due to the difference in the speeds V1 and V2; in particular, the neck length, the neck starting point and the neck final point differ in the two processes: in other words, the neck length and shape vary depending on the process parameters.

Should the preform diameter be measured at a point fixed with respect to the burner, the difference in the diameters measured in the processes could be as large as 1.5 mm, without differences in the preform final diameter after the elongation. It may even happen that the diameter is measured at a point where the neck is not yet begun, or is already terminated.

This confirms that measuring the preform diameter in one or more discrete points at predetermined, fixed positions with respect to the burner (or, more generally, fixed with respect to the heated region of the preform) does not provide sufficient information for effectively controlling the elongation stage.

Figure 12:
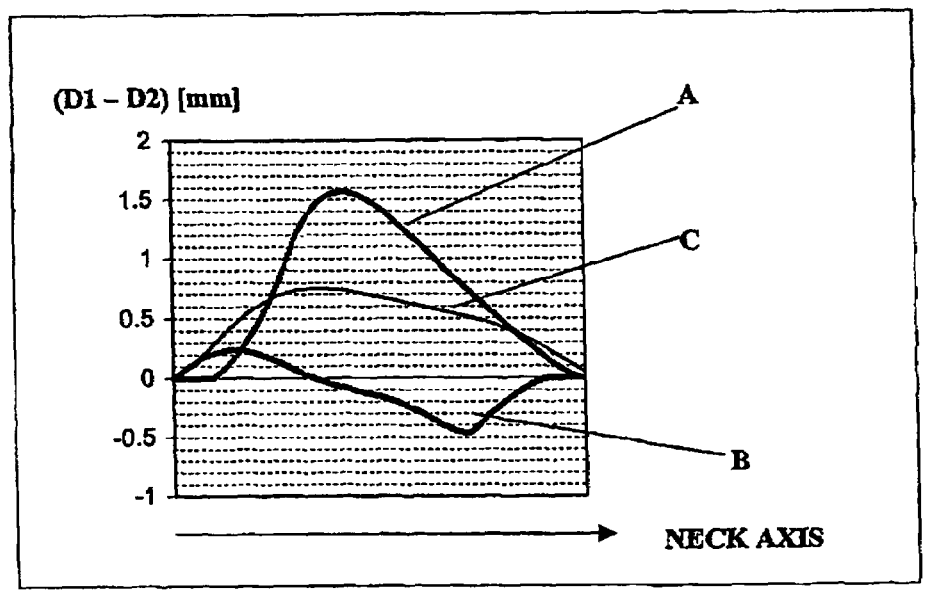
FIG. 12 shows the difference in the diameters of the two preform necks measured according to a conventional technique and according to two techniques according to two embodiments of the present invention.

The diagram in FIG. 12 reports the difference (D1−D2) of the preform diameters along the preform axes in the two processes. In particular, curve A was obtained by calculating the difference (D1−D2) at points located at a same longitudinal position within the heated region of the preform; curve B was obtained calculating the diameter difference (D1−D2) at points located at a same distance from the beginning of the neck (which, as mentioned, varies in the two processes); curve C was obtained calculating the difference (D1−D2) at points located at a distance from the beginning of the neck equal to a same, prescribed percentage of the neck length, for example half the neck length.

It can be appreciated that by measuring the preform diameter at points whose position is not fixed with respect to the heated region, but varies depending on the neck geometry as derived from the inspection of the neck profile, it is possible to reduce the errors inherent to the difference in the neck geometry induced by disturbs or variation of the process parameters. While in the case of curve A the maximum difference (D1−D2) is higher than 1.5 mm, such a difference is lower than 0.8 mm and 0.5 mm in the case of curves C and B, respectively: a reduction of more than ⅔ can be achieved.

FIG. 11 shows that the geometry of the neck may vary significantly even if the initial and final diameters are the same. In this condition, the conventional control techniques, detecting a deviation of the measured diameter from the target diameter, would cause an undesired variation in the final diameter.

FIG. 12 shows instead that the deviation from a target diameter can be significantly reduced if the diameter of the preform is determined at a point that is not fixed with respect to the heated region, but whose position varies according to the geometry of the neck, derived from the inspection of the acquired neck profile. In this way, undesired variations on the final diameter are greatly reduced.

Although the present invention has been disclosed and described by way of some embodiments, it is apparent to those skilled in the art that several modifications to the described embodiments, as well as other embodiments of the present invention are possible without departing from the scope thereof as defined in the appended claims.

In particular, albeit in the detailed description that has been provided the image capturing means were visual image capturing means, other types of image capturing means may be exploited, for example operating in the infrared spectrum.

The present invention can be applied to any process of manufacturing of optical fiber preforms that includes an elongation stage, for example MCVD, OVD and VAD processes.

What is claimed is:

1. An optical fiber preform elongation process, comprising:
   heating the preform so as to soften one region thereof;
   elongating the preform by submitting the preform to a traction;
   determining, during the step of elongating, the preform diameter in at least one measuring point along the preform;
   controlling the step of elongating on the basis of the determined diameter;
   measuring, during the step of elongating, at least a geometrical parameter of the preform, the geometrical parameter being different than the at least one measuring point; and
   controlling, during the step of elongating, the position of said at least one measuring point according to the measured geometrical parameter.

2. The process according to claim 1, wherein measuring at least a geometrical parameter of the preform comprises determining the profile of at least a portion of the softened region.

3. The process according to claim 2, wherein measuring at least a geometrical parameter of the preform comprises detecting, from said determined profile, at least one among a softened region starting point and a softened region final point, and wherein controlling the position of said measuring point comprises choosing a diameter measuring point located at a predetermined distance from one among the softened region starting point and the softened region final point.

4. The process according to claim 3, wherein measuring at least a geometrical parameter of the preform further comprises detecting, from said determined profile, the length of the softened region, and wherein said predetermined distance is a predetermined percentage of said length.

5. The process according to claim 2, wherein determining the profile comprises detecting a predetermined number of points along the profile of the preform and interpolating said points.

6. The process according to claim 2, wherein determining the profile comprises capturing a digital image of the at least a portion of the softened region.

7. The process according to claim 1, wherein controlling the step of elongating comprises comparing the determined diameter with a target diameter.

8. The process according to claim 1, wherein heating the preform comprises feeding the preform to a furnace at a first speed, and submitting the preform to a traction which comprises pulling the preform out of the furnace at a second speed; and wherein controlling the step of elongating comprises controlling at least one among the first speed and the second speed.

9. The process according to claim 1, wherein heating the preform comprises exposing the preform to a heater movable along a preform axis at a first speed, and applying a traction which comprises pulling at least one end of the preform at a second speed, and wherein controlling the step of elongating comprises controlling at least one among the first speed and the second speed.

10. An optical fiber preform elongation process, comprising:
    heating the preform so as to soften one region thereof;
    elongating the preform by submitting the preform to a traction;
    determining a preform diameter at a measuring point in the softened region;
    determining at least a geometrical parameter of the preform which comprises detecting the profile of at least a portion of the softened region, the geometrical parameter being different than the measuring point in the softened region;
    controlling the step of elongating on the basis of the determined preform diameter; and
    controlling the position of the measuring point according to the geometrical parameter.

11. The process according to claim 10, wherein detecting the profile comprises detecting a predetermined number of points along the profile of the preform and interpolating said points.

12. The process according to claim 10, wherein detecting the profile comprises capturing a digital image of the at least a portion of the softened region.

13. The process according to claim 10, wherein controlling the step of elongating comprises comparing the determined diameter with a target diameter.

14. The process according to claim 13, further comprising controlling the target diameter according to said detected profile.

15. The process according to claim 13, wherein the preform diameter is determined from said detected profile.

16. The process according to claim 10, wherein determining the preform diameter comprises controlling the position of the measuring point according to said detected profile.

17. The process according to claim 10, wherein determining at least a geometrical parameter comprises determining, from said detected profile, at least one among a softened region starting point and a softened region final point, and wherein controlling the position of the measuring point comprises choosing a measuring point located at a predetermined distance from one among the softened region starting point and the softened region final point.

18. The process according to claim 17, wherein measuring at least a geometrical parameter of the preform further comprises detecting, from said determined profile, the length of the softened region, and wherein said predetermined distance is a predetermined percentage of said length.

19. A process for manufacturing an optical fiber, comprising producing a glass preform and drawing the glass preform into an optical fiber, wherein producing a glass preform comprises the steps of:
   heating an intermediate preform so as to soften one region thereof;
   elongating the intermediate preform by submitting the intermediate preform to a traction;
   detecting, during the step of elongating, the preform diameter in at least one measuring point along the intermediate preform;
   controlling the step of elongating on the basis of the detected diameter;
   measuring, during the step of elongating, at least a geometrical parameter of the preform, the geometrical parameter being different than the at least one measuring point; and
   varying, during the step of elongating, said at least one measuring point according to the measured geometrical parameter.

20. An apparatus for elongating an optical fiber preform, comprising:
   a monitoring device for obtaining information on geometrical parameters of the preform being elongated, said monitoring device comprising an image capturing device for obtaining a profile of at least a portion of a softened region of the preform, and a processing device for analyzing the profile and extracting information on the preform geometrical parameters; and
   a control device for controlling at least a location of a measuring point on the preform using the preform geometrical parameters information, wherein the geometrical parameters information is different than the location of the measuring point.

21. An apparatus for elongating an optical fiber preform, the apparatus comprising:
   means for elongating the preform;
   means for determining the preform diameter in at least one measuring point along the preform;
   means for controlling the elongation of the preform on the basis of the determined diameter;
   means for measuring at least a geometrical parameter of the preform, the geometrical parameter being different than the at least one measuring point; and
   means for controlling the position of said diameter measuring point according to the measured geometrical parameter.

* * * * *